UNITED STATES PATENT OFFICE.

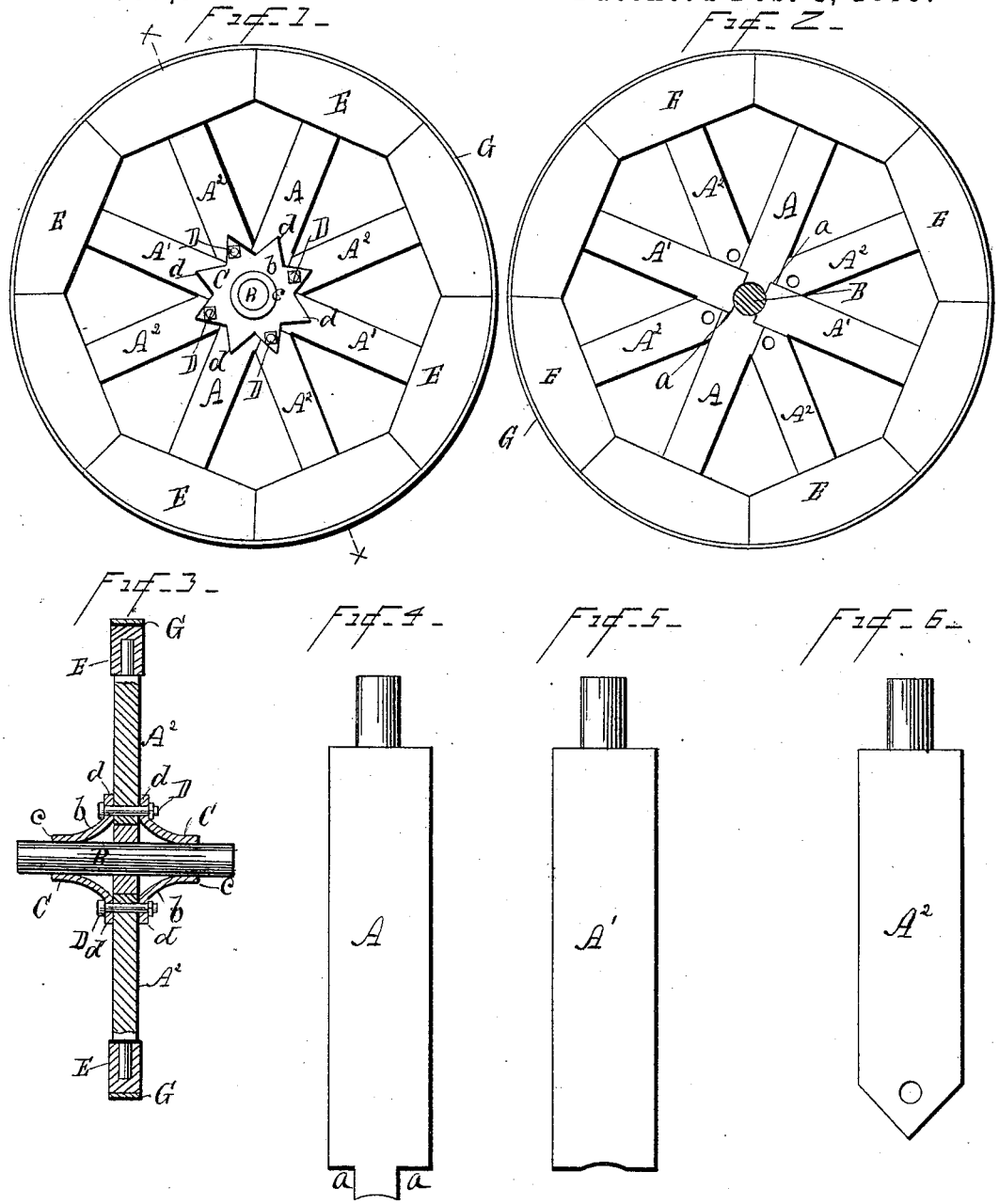

CHARLES F. FARNSWORTH, OF MEMPHIS, TENNESSEE.

WHEELBARROW-WHEEL.

SPECIFICATION forming part of Letters Patent No. 397,347, dated February 5, 1889.

Application filed June 13, 1888. Serial No. 276,988. (No model.)

*To all whom it may concern:*

Be it known that I, CHARLES F. FARNSWORTH, a citizen of the United States, residing in Memphis, in the county of Shelby and State of Tennessee, have invented an Improved Wheelbarrow-Wheel; and I do hereby declare that the following is a full and exact description of the same, reference being had to the accompanying drawings, forming part of this specification.

Figure 1 of the drawings represents a side view of a wheelbarrow-wheel constructed according to my invention; Fig. 2, a similar view, the iron flange next to the point of sight being removed; Fig. 3, an axial section of the wheel in a plane indicated by the line 1 1, Fig. 1; Figs. 4, 5, and 6 views, respectively, of the different forms of spokes used.

Like letters designate corresponding parts in all of the figures.

My improved wheelbarrow-wheel is constructed as follows: First, the spokes are peculiarly formed and joined at the hub. There are two spokes, A A, one being (shown separately in Fig. 4) arranged in line or diametrically opposite to each other, each having at its inner end right-angled notches $a\,a$, cutting out its corners, substantially as shown. The two spokes do not meet in the center of the wheel, there being space enough between them to admit the spindle B of the barrow. Then there are two more spokes, A' A', (one being shown separately in Fig. 5,) arranged in line at right angles to the spokes A A, and having square inner ends, the corners of which fit into the notches in the ends of the said spokes A A, as clearly represented in Fig. 2. There is also room between the inner ends of these spokes for the spindle. These four spokes are thus locked together firmly and immovably at the center of the wheel, cannot become displaced, nor driven farther in toward the center, and they serve as the main or frame part of the wheel. Then there are additional spokes $A^2\,A^2$, (one being shown separately in Fig. 6,) chamfered to a blunt wedge or right-angled form at the inner end, so as to fit accurately into the angles formed by the junction of the spokes A A', as shown. Thus a close, firm, and unyielding joint is made between all the spokes at the hub of the wheel.

In order to unite all the spokes rigidly and form a strong and firm wheel, the hub of the wheel is completed by means of two cast-iron flanges, C C, peculiarly constructed as shown. Such flange is made broad where it fits against the outer surface of the spokes, and has pointed projections $d\,d$, where they cover the spokes, or "star-shaped," and its center portion projects a considerable distance outward in conical or tubular form, as shown in Fig. 3. The main part $b$, being hollow, allows of lightness of construction, while the outer end, $c$, of the same is simply bored to form a bearing for the spindle. Thus the two flanges on the two sides of the wheel form two bearings for the spindle at such a distance from the center of the wheel as to give a very strong bracing to the wheel and make it unusually rigid and of great strength. The flanges and spokes are all united by bolts, or their equivalents—preferably screw-bolts D D—passed through both flanges and one through the middle of each spoke, and through each alternate spoke, and powerfully clamped together by nuts screwed upon the bolts.

The advantage of the star form, or form with projections lapping outward upon the spokes, is that additional strength and bracing-power are thereby gained with the least weight of metal in the flanges.

The fellies E E and tire G of the wheel have no special construction in this invention.

I claim as my invention—

1. In a wheelbarrow-wheel, the combination of the spokes A A, having notches $a\,a$ in their inner ends, spokes A' A', having square inner ends fitting in the said notches of the first spokes, and the spokes $A^2\,A^2$, having their inner ends formed to fit into the angles between the other spokes, substantially as and for the purpose herein set forth.

2. In combination with the spokes A A' $A^2$ and spindle B, the iron flanges C C, having hollow extensions $b\,b$, and tubular bearings $c$ $c$, fitting around the spindle, and formed with peripheral projections $d\,d$, and the bolts D D, passed through the said projections $d\,d$ and the spokes, substantially as and for the purpose herein specified.

In witness whereof I have hereunto signed my name in the presence of two subscribing witnesses.

CHARLES F. FARNSWORTH.

Witnesses:
PETER H. RUSSELL,
JACOB A. EVANS.